Jan. 11, 1966 E. FATUZZO ETAL 3,229,261

STORAGE DEVICE WITH HEAT SCANNING SOURCE FOR READOUT

Filed Feb. 5, 1963

INVENTOR.
ENNIO FATUZZO &
HANS ROETSCHI

BY Samuel Cohen

ATTORNEY

United States Patent Office 3,229,261

Patented Jan. 11, 1966

3,229,261

STORAGE DEVICE WITH HEAT SCANNING SOURCE FOR READOUT

Ennio Fatuzzo, Adliswil, Zurich, and Hans Roetschi, Horgen, Zurich, Switzerland, assignors to Radio Corporation of America, a corporation of Delaware Filed Feb. 5, 1963, Ser. No. 256,317

5 Claims. (Cl. 340—173)

The present invention relates to a new and improved information storage system and method.

An object of the invention is to provide a system and method for storing a relatively large amount of information in a relatively small space.

Another object of the invention is to provide an information storage system which is capable of storing either analog or binary information.

In the system of the invention, a light image is stored in a ferroelectric material in the form of a pattern of polarization. This storage device includes, in series, a photoconductor element and ferroelectric element, and means for applying an electric field across the two elements while applying a light image to the photoconductor element. The stored polarization pattern corresponding to the light image may be read out by heating different areas of the ferroelectric element and sensing the corresponding changes in polarization which occur. These changes are manifested as changes in current flow through an external circuit connected across the storage device.

The invention is discussed in greater detail below and is illustrated in the following drawings, of which:

The so-called pyroelectric effect, which is a known effect and is described in the literature, occurs in solids which have "built-in" polarization. Polarization refers to the orientation in a given direction of the bound charge present in certain bodies. A body of this type is shown schematically in FIGURE 1. Within the body are numerous electrical dipoles which are oriented in the same direction. The dipoles are shown schematically in FIGURE 1 as arrows, the heads of the arrows representing a positive charge and the tails a negative charge. The body is said to be pyroelectric if the magnitude of the built-in polarization is temperature dependent and is said to be ferroelectric if the direction of the built-in polarization can be reversed by application of the electric field.

Figure 1:
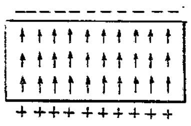
FIGURE 1 is a diagrammatic showing of a ferroelectric body.

As can be seen from FIGURE 1, the charge in the body causes free charges to deposit on surfaces of the body. As the polarity shown of the bound charge in the body of FIGURE 1 is positive at the upper surface and negative at the lower surface, free charges of opposite polarity, that is, negative at the upper surface and positive at the lower surface deposit. If the temperature of the body is changed, the polarization of the body changes and hence the compensating free charges at the opposite surfaces of the body also change, and by the same amount.

Figure 2:
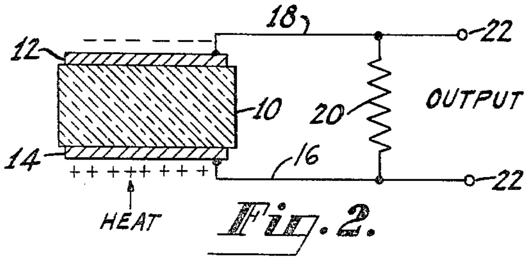
FIGURE 2 is a showing of the body of FIGURE 1 together with a circuit for sensing the "pyroelectric effect" of the ferroelectric body.

The effect above may be demonstrated in the manner shown in FIGURE 2. Here the pyroelectric body 10 has electrodes 12 and 14 located on opposite surfaces of the pyroelectric body. If heat is applied through one of the electrodes 14 to the body 10 thereby changing the magnitude of the polarization of the body, the magnitude of the free charges accumulated on the electrodes also changes. The change in the free charge is manifested as a current flow through the external circuit which includes wires 16 and 18 and resistor 20. This current may be measured as a voltage across the resistor, at output terminals 22.

The magnitude of the current flow discussed above is proportional to the rate of change of polarization with respect to time, as set forth in the following equation:

$$I=\frac{dP}{dt}=\frac{dP}{dT}\cdot\frac{dT}{dt}$$

where $I$=current
$P$=polarization
$t$=time
$T$=temperature

It is clear from this equation that the larger the temperature variation with time $$\left(\frac{dT}{dt}\right)$$

the greater the current flow I. The factor $$\frac{dP}{dt}$$

is known as the "pyroelectric coefficient" $\pi$.

Summarizing the above, the current flow, known as the "pyroelectric current," has a magnitude which is proportional to the rate of change of temperature T. In other words, when the pyroelectrical crystal is heated more rapidly, the pyroelectric current is relatively large, whereas when the pyroelectric crystal is heated more slowly, the pyroelectric current is small.

Figure 3:
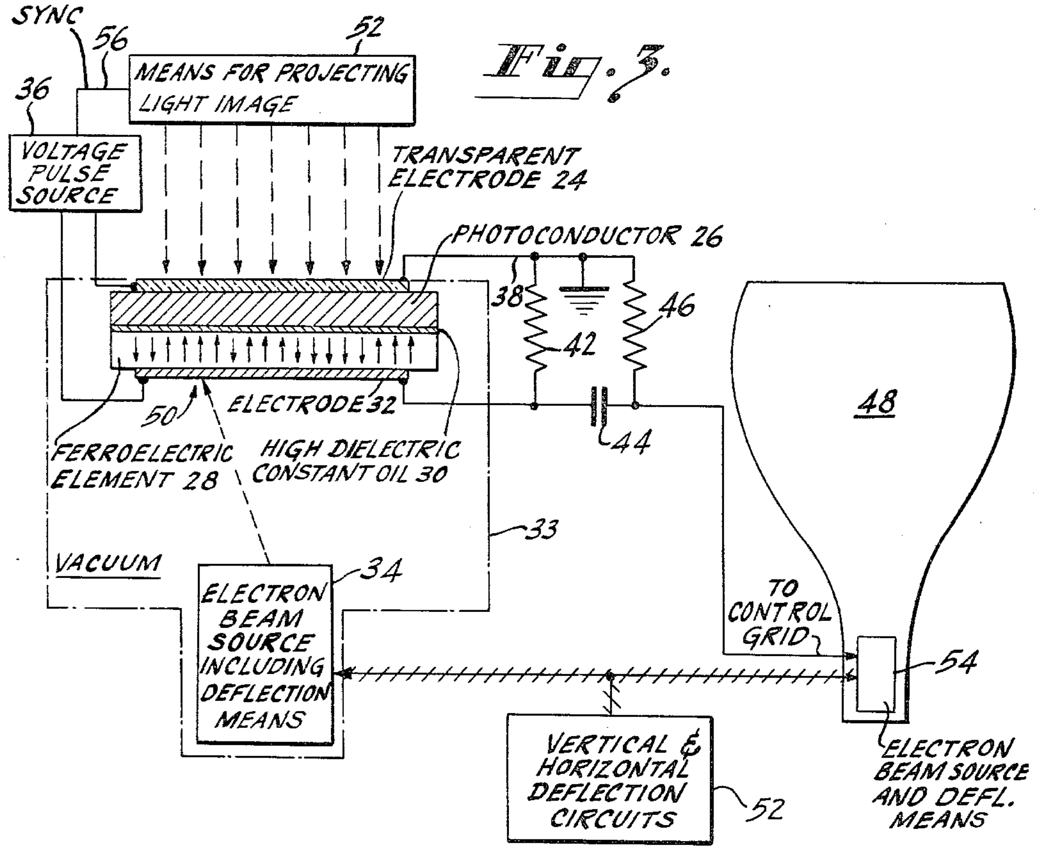
FIGURE 3 is a block and schematic diagram of a system for storing and reading out information according to the present invention.

The storage device of the present invention is illustrated in FIGURE 3. It consists of a transparent conductive electrode 24 on one surface of a photoconductor element 26, such as cadmium sulfide. The photoconductor is electrically coupled to a ferroelectric element 28, such as a barium titanate crystal, through a thin film of a high dielectric constant oil 30. The high dielectric oil capacitively couples the photoconductor to the ferroelectric element. The final layer of the storage medium is a conductive electrode 32.

The storage device above is located in a vacuum, as indicated schematically by the dot dashed line 33. Also located within the vacuum is a source providing an electron beam and the means for focusing and deflecting the electron beam, all illustrated as a single block 34.

A voltage pulse source 36 is connected across the electrodes 24, 32, respectively. A second circuit including conductors 38 and 40, a resistor 42 and an RC circuit composed of condenser 44 and resistor 46 is also connected across the electrodes 24, 32. This second circuit leads to the control grid of a cathode ray device, such as a kinescope, illustrated schematically at 48.

The deflection circuits for the electron beams of the storage device 50 and the display device 48 are illustrated by a single block 52. The circuits may include horizontal and vertical sawtooth wave generators and other circuits as employed in the television art, for example. The voltages generated are applied both to the deflection means 34 and the deflection means 54.

In the operation of the system of FIGURE 3, a light image is projected from the arrangement illustrated schematically by block 56 onto the transparent electrode 24 of the storage device 50. At the same time, a voltage pulse from source 36 is applied across the electrodes 32, 24. Those areas of the photoconductor 26 which receive light act as relatively low values of resistance whereas those areas receiving little or no light act as relatively high values of resistance. The electric field which develops across the ferroelectric element due to the voltage pulse applied by source 36 is chosen to have such a duration as to permit the ferroelectric element to switch its polarization at the areas thereof corresponding to the illuminated areas of the light image, but insufficient to permit the ferroelectric element to switch its polarization at the areas corresponding to the dim areas in the light image. This arrangement causes a pattern of polarization, which corresponds to the light image, to be "burned into" the ferroelectric element 28. The pattern is illustrated schematically by arrows facing in different directions.

The voltage pulse source 36 and the means for projecting the light image may be synchronized with one another, as indicated schematically by lead 58.

When it is desired to read out the stored image, the electron beam is turned on and the vertical and horizontal deflection circuits 52 caused to scan the beam in television fashion (for example) over the electrode 32. (Other types of scans such as spiral, vertical and so on may be used instead.) The electrode 32 is made relatively thin so that the heat produced by the electron beam penetrates through the electrode and very quickly heats the ferroelectric material lying beneath the electrode 32. Moreover, the electrode 32 is sufficiently thin that there is little spreading of heat in the transverse direction due to thermal conduction. When the ferroelectric element is heated, a pyroelectric current develops which passes through lead 40 and resistor 42 to ground. The polarity of this current depends upon the orientation of the bound charge (dipoles) where the electron beam hits. When the polarization of the bound charge is negative (a positive free charge on the surface) where the electron beam hits, a negative pyroelectric voltage appears at the resistor. When the polarization of the bound charge is positive (a negative free charge on the surface) where the electron beam hits, a positive pyroelectric voltage appears at the resistor.

The pyroelectric voltage developed at the resistor 42 is applied (through the RC network composed of condenser 44 and resistor 46) to the control grid of the cathode ray tube display device 48. Concurrently, the electron beam of the device 48 is scanned by the vertical and horizontal deflection circuits 52 in the same manner as the electron beam of the storage device 50. Accordingly, a light pattern appears on the screen of the device 48 which corresponds to the pattern of polarization stored in the storage device 50.

The magnitude of the pyroelectric current developed when the electron beam strikes the electrode 32 is relatively large in view of the small size cross-section of the electron beam, and the resulting intense (that is, rapid) heating of the pyroelectric element. After the electron beam has passed over the area that is heated, that area of the pyroelectric element cools down slowly and this produces a pyroelectric voltage of opposite polarity. However, in view of the fact that the cooling down of a spot takes a much longer time than the heating up of the spot, the pyroelectric voltage developed due to cooling is relatively small. Furthermore, the difference in duration between the fast pyroelectric signal produced by the heating and the slow pyroelectric signal produced by cooling can also be used to attenuate further the signal due to cooling. This is achieved by proper choice of the time constant of the network composed of condenser 44 and resistor 46. The value of resistor 46 is much larger than resistor 42, and the time constant of network 44, 46 is chosen to be longer than the duration of the heating pulse and shorter than the duration of the cooling pulse. Other methods may be used for reading out the stored pattern of polarization. Some of these methods depend only upon the free charges accumulated on an electrode and not on any pyroelectric effect. One such method consists in bombarding the ferroelectric element with a low energy electron beam. The beam is deflected differently by oppositely polarized regions.

By properly locating an electrode in space, one may collect only the electrons deflected by regions having a certain direction of polarization and hence, this way, distinguish between regions oppositely polarized.

In the system illustrated in FIG. 3 the storage device 50 is shown to be relatively large for purposes of clarity. However, in practice, the area can be extremely small, the limiting factor being the fineness to which an electron beam can be focused. The reason that the storage element can be a very small size and still have high definition is that the domain walls in the ferroelectric material are very thin (1 lattice constant thick) and therefore a large number of differently arranged domains can be contained in a very small volume of ferroelectric material. As an example of the size reduction which is possible, if one employs an electron beam which is three microns in diameter, a ferroelectric crystal may be employed which has an area 1 millimeter by 1 millimeter at its surface. These parameters permit a scan of 300 lines over the surface of the ferroelectric crystal (actually over the surface of electrode 32). Very fine electron beams can be obtained in the present state of the art using techniques similar to those employed for high intensity electron beam systems used for drilling small holes in metals, ferrites and the like. With beams of larger cross-section it is necessary to employ storage elements of somewhat larger size as, for example, crystals of 10 millimeters by 10 millimeter surface area.

It should be appreciated that although the system shown in FIG. 3 includes only 1 storage element within the crystals, a matrix of such elements may be employed. Each such element is capable of storing a picture (of the order of $10^6$ bits). For example, even with crystals as large as 10 millimeters by 10 millimeters several thousand or more such crystals may easily be placed within a single vacuum chamber and the electron beam programmed to read out the information stored in any desired sequence.

Figure 4:
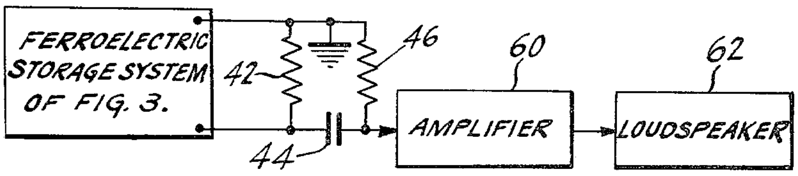
FIGURE 4 is a block circuit diagram of another system according to the present invention.

The embodiment of the invention shown in FIG. 3 stores a picture as a pattern of polarization. It is of course possible to store other types of information as, for example, binary information or audio information. Binary information may be projected as a light pattern consisting of opaque and transparent areas, where an opaque area may represent the binary bit zero and a transparent area the binary bit one. Audio information may be written into the device by a beam of light the intensity of which is modulated in accordance with an audio signal and which is scanned across the photoconductor either by mechanical or electrical means. The stored information may be read out in the manner shown in FIG. 4. An electron beam is employed, just as in FIG. 3, to scan the stored pattern of polarization. The read out scan of the electron beam follows the same path that the input "writing" light beam follows. The output of the storage device may be applied through an amplifier 60 to a loudspeaker 62 or to any other audio transducer such as a magnetic tape, record or the like.

The storage system of the present invention is preferably operated in a non-destructive mode. In this mode of operation, the heating produced by the electron beam is insufficient to raise the temperature of the ferroelectric element above the Curie point. When the crystal is heated by the electron beam, the magnitude of the polarization is decreased but the alignment of the dipoles remains unchanged. After the electron beam passes a given area and the crystal cools at that area the magnitude of the polarization at that area returns to its original value, again, without altering the alignment of the dipoles. Thus, the read out is non-destructive.

While the dimensions of the elements of the storage device are not critical, the following examples are illustrative. The transparent electrode 24 may be about 100 angstroms thick; the electrode 32 may be several hundred angstroms thick; the ferroelectric crystal may be about a tenth of a millimeter thick and the photoconductor layer 26 may also be about a tenth of a millimeter thick.

As already mentioned, the purpose of the oil is to provide capacitive coupling between the photoconductor and ferroelectric elements. If desired, an electrically conductive layer may be employed instead. However, if a conductive layer is employed, it must be very thin to reduce conduction in a direction parallel to the film and to thereby reduce "cross-talk."

What is claimed is:

1. In combination, a ferroelectric element; a photoconductive element electrically coupled at one surface thereof with a surface of the ferroelectric element; means coupled to the two elements for applying, for a given time duration, an electric field through the two elements; means for concurrently applying a light pattern to the photoconductive element, whereby a pattern of polarization is formed in the ferroelectric element; and heating means for scanning the ferroelectric element to produce pyroelectric voltages corresponding to the pattern of polarization.

2. A system for storing and reading out information comprising, in combination, a planar ferroelectric element; a planar photoconductive element electrically coupled to the ferroelectric element at one surface of the ferroelectric element; means coupled to the two elements for applying a voltage across the two elements to thereby produce an electric field through the two elements; means for concurrently applying a light pattern to the photoconductive element whereby a pattern of polarization is produced in the ferroelectric element; a heating source; and means for reading out the pattern of polarization stored in the ferroelectric element comprising means for scanning the ferroelectric element with said heating source to obtain pyroelectric voltages corresponding to the stored pattern of polarization.

3. A system for storing and reading out information comprising, in combination, a planar ferroelectric element; a planar photoconductive element electrically coupled to the ferroelectric element at one surface of the ferroelectric element; means coupled to the two elements for applying a voltage pulse across the two elements to thereby produce an electric field through the two elements; means for concurrently applying a light pattern to the photoconductive element whereby a pattern of polarization is produced in the ferroelectric element; and means for reading out the pattern of polarization stored in the ferroelectric element comprising a source producing an electron beam for effecting localized heating of the ferroelectric element and means for scanning the ferroelectric element with said electron beam to obtain pyroelectric voltages corresponding to the stored pattern of polarization.

4. A system for storing and reading out information comprising, in combination, a planar ferroelectric element; a planar photoconductive element electrically coupled to the ferroelectric element at one surface of the ferroelectric element; means coupled to the two elements for applying a voltage across the two elements to thereby produce an electric field through the two elements; means for concurrently applying a light pattern to the photoconductive element whereby a pattern of polarization is produced in the ferroelectric element; means for producing an electron beam for effecting localized heating of said ferroelectric element; means for scanning the ferroelectric element with said beam to obtain pyroelectric voltages corresponding to the stored pattern of polarization; and a display device connected to receive said pyroelectric voltages for producing a visual display corresponding to said pattern of polarization.

5. A system for storing and reading out information comprising, in combination, a planar ferroelectric element;

a planar photoconductive element electrically coupled to the ferroelectric element at one surface of the ferroelectric element;

means coupled to the two elements for applying a voltage across the two elements to thereby produce an electric field through the two elements;

means for concurrently applying a light pattern to the photoconductive element whereby a pattern of polarization is produced in the ferroelectric element;

means for producing an electron beam and directing it at the ferroelectric element for heating the ferroelectric element;

a display device including an electron beam source and a screen on which the beam impinges for producing a visual display;

means coupled to the ferroelectric element for producing a pyroelectric voltage when the electron beam strikes the ferroelectric element;

means coupled to the last-named means for applying said voltage as a modulating voltage for the electron beam of said display device;

and means coupled to the electron beam source and to the means for producing an electron beam for scanning both of the electron beams in synchronism.

References Cited by the Examiner

UNITED STATES PATENTS

| | | | |
|---|---|---|---|
| 2,648,823 | 8/1953 | Kock et al. | 340—173.2 |
| 2,691,738 | 10/1954 | Matthias | 340—173.2 |
| 2,905,830 | 9/1959 | Kazan | 340—173 |
| 3,083,262 | 3/1963 | Hanlet | 340—173.2 |

IRVING L. SRAGOW, *Primary Examiner.*